United States Patent
David et al.

(10) Patent No.: US 12,017,635 B2
(45) Date of Patent: *Jun. 25, 2024

(54) SLIP DETECTION AND MITIGATION FOR AN ELECTRIC DRIVE POWERTRAIN HAVING A HIGH RATIO TRACTION DRIVE TRANSMISSION

(71) Applicant: Dana Automotive Systems Group, LLC, Maumee, OH (US)

(72) Inventors: Jeffrey M. David, Cedar Park, TX (US); Travis J. Miller, Austin, TX (US)

(73) Assignee: DANA AUTOMOTIVE SYSTEMS GROUP, LLC, Maumee, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/934,154

(22) Filed: Sep. 21, 2022

(65) Prior Publication Data

US 2023/0014139 A1 Jan. 19, 2023

Related U.S. Application Data

(63) Continuation of application No. 17/233,185, filed on Apr. 16, 2021, now Pat. No. 11,485,346, which is a
(Continued)

(51) Int. Cl.
*F16H 13/06* (2006.01)
*B60W 10/105* (2012.01)
(Continued)

(52) U.S. Cl.
CPC ........ *B60W 10/105* (2013.01); *B60W 10/115* (2013.01); *F16H 59/38* (2013.01); *F16H 2059/465* (2013.01)

(58) Field of Classification Search
CPC ... B60W 10/105; B60W 10/115; F16H 59/38; F16H 2059/465; F16H 15/04;
(Continued)

(56) References Cited

U.S. PATENT DOCUMENTS 4,322,798 A * 3/1982 McCoin .................. F16H 15/20
476/3
4,483,216 A 11/1984 Takahashi et al.
(Continued)

FOREIGN PATENT DOCUMENTS

CN 105317949 A 2/2016
JP H04015358 A 1/1992
(Continued)

OTHER PUBLICATIONS

JP2011002082 machine translation filed Jan. 23, 2023, pp. 1-5. (Year: 2023).*
(Continued)

*Primary Examiner* — Tisha D Lewis
(74) *Attorney, Agent, or Firm* — McCoy Russell LLP

(57) ABSTRACT

A method of controlling a continuously variable electric drivetrain (CVED) including a high ratio traction drive transmission and at least one of a first motor-generator and a second motor-generator is disclosed. The method includes the steps of receiving an output speed, determining a kinematic output speed, and determining a slip state of the high ratio traction drive transmission based on a comparison of the output speed to the kinematic output speed.

19 Claims, 9 Drawing Sheets

Related U.S. Application Data continuation of application No. 16/577,305, filed on Sep. 20, 2019, now Pat. No. 11,021,144.

(60) Provisional application No. 62/733,872, filed on Sep. 20, 2018.

(51) Int. Cl.
*B60W 10/115* (2012.01)
*F16H 59/38* (2006.01)
*F16H 59/46* (2006.01)

(58) Field of Classification Search
CPC ........ F16H 15/50; F16H 15/40; F16H 61/664; F16H 61/6646; F16H 13/08; F16H 13/06; F16H 13/10; F16H 13/14; F16H 15/503; F16H 15/52; F16H 15/54; F16H 15/56
See application file for complete search history.

(56) References Cited

U.S. PATENT DOCUMENTS

| | | |
|---|---|---|
| 4,709,589 A | 12/1987 | Kraus |
| 4,846,008 A | 7/1989 | Kraus |
| 5,385,514 A | 1/1995 | Dawe |
| 6,964,311 B2 | 11/2005 | Yang |
| 7,455,617 B2 | 11/2008 | Miller et al. |
| 7,610,976 B2 | 11/2009 | Holmes et al. |
| 7,650,956 B2 | 1/2010 | Hirata et al. |
| 8,152,677 B2 | 4/2012 | Knepper et al. |
| 8,169,177 B2 | 5/2012 | Kishimoto |
| 8,517,875 B2 | 8/2013 | Wenthen |
| 8,538,641 B2 | 9/2013 | Yang |
| 8,862,298 B2 | 10/2014 | Murakami et al. |
| 9,096,218 B2 | 8/2015 | Kitahata et al. |
| 2004/0129097 A1 | 7/2004 | Otaki |
| 2013/0024062 A1* | 1/2013 | Murakami ............... B60K 6/36 180/65.265 |
| 2014/0200110 A1 | 7/2014 | Matsunami |

FOREIGN PATENT DOCUMENTS

| | | | |
|---|---|---|---|
| JP | 2879592 B2 | 4/1999 | |
| JP | 2011002075 A * | 1/2011 | ............. F16H 13/08 |
| JP | 2011002082 A * | 1/2011 | ............. F16H 13/08 |
| JP | 2011002082 A | 1/2011 | |
| JP | 2016034223 A | 3/2016 | |
| SU | 1283462 A1 | 1/1987 | |
| WO | WO-03064891 A1 * | 8/2003 | ............. F16H 13/08 |
| WO | WO-2017049049 A1 * | 3/2017 | ............... B60K 6/26 |
| WO | WO-2018005747 A1 * | 1/2018 | ............. B60K 6/365 |
| WO | WO-2018071376 A1 * | 4/2018 | ........... F16H 61/664 |
| WO | WO-2018085339 A1 * | 5/2018 | ........... F16H 61/664 |

OTHER PUBLICATIONS

State Intellectual Property Office of the People's Republic of China, Office Action and Search Report Issued in Application No. 201910893487.3, dated Jul. 19, 2022, 17 pages. (Submitted with Partial Translation).

\* cited by examiner

215

Diagnostic Table

| | No slip | Sun to roller slip | Ring to roller slip | Indeterminate slip | Damaged Gearing |
|---|---|---|---|---|---|
| $\omega_{c\_wheel} = \omega_{c\_motors}$ | Yes | No | No | No | No |
| $\omega_s = \omega_{MG2}$ | Yes | No | Yes | No | Yes |
| $\omega_r = \omega_{MG1}$ | Yes | Yes | No | No | Yes |

SLIP DETECTION AND MITIGATION FOR AN ELECTRIC DRIVE POWERTRAIN HAVING A HIGH RATIO TRACTION DRIVE TRANSMISSION

CROSS-REFERENCE TO RELATED APPLICATIONS

The present patent application is a continuation of U.S. patent application Ser. No. 17/233,185, filed on Apr. 16, 2021. U.S. patent application Ser. No. 17/233,185 is a continuation of U.S. patent application Ser. No. 16/577,305, filed on Sep. 20, 2019, which claims the benefit of U.S. Provisional Patent Application No. 62/733,872, filed on Sep. 20, 2018. The entire contents of each of the above-referenced applications are incorporated herein by reference for all purposes.

BACKGROUND

Electric and hybrid electric vehicles are enjoying increased popularity and acceptance due in large part to the cost of fuel and greenhouse carbon emission government regulations for internal combustion engine vehicles. Hybrid vehicles include both an internal combustion engine as well as an electric motor to propel the vehicle.

In current electric axle designs for both consuming as well as storing electrical energy, the rotary shaft from a combination electric motor-generator is coupled by a gear train to the driven wheels of the vehicle. As such, the rotary shaft for the electric motor-generator unit rotates in unison with the wheel based on the speed ratio of the gear train. Powertrains implementing electric motors are faced with a large speed reduction between the electric motor and the driven wheels. In some cases, electric machines having high rotational speeds, for example higher than 30,000 rpm, are being considered for implementation in a variety of powertrain configurations. It is appreciated that traditional gearing structures with high transmission ratios, for example those with transmission ratios in the range of 25-40, are needed for implementation of high speed electric machines. Traditional toothed gearing having transmission ratios in said range are prohibitively expensive to manufacture and often are prohibitively noisy during operation.

Accordingly, it would be desirable to develop a method of controlling an electric drivetrain which enhances efficiency and accuracy, while cost thereof is minimized.

SUMMARY

In concordance and agreement with the present disclosure, develop a method of controlling an electric drivetrain which enhances efficiency and accuracy, while cost thereof is minimized, has surprisingly been discovered.

In one embodiment, a method of controlling an electric drivetrain, comprises: providing a traction drive transmission including a ring member, a carrier having a plurality of traction members, and a sun member; and determining a slip state of the traction drive transmission based on a comparison of a speed of at least one of the ring member, the carrier, the plurality of traction members, and the sun member to a kinematic speed of the at least one of the ring member, the carrier, the plurality of traction members, and the sun member.

As aspects of certain embodiments, the traction drive transmission is operably coupled to at least one motor-generator.

As aspects of certain embodiments, the method further comprises switching the at least one motor-generator from a torque-control mode to a speed-control mode in order to mitigate the slip state.

As aspects of certain embodiments, the method further comprises mitigating the slip state of the traction drive transmission by adjusting a speed of the at least one motor-generator.

As aspects of certain embodiments, the method further comprises switching the at least one motor-generator from the speed-control mode to the torque-control mode once the traction drive transmission is no longer in the slip state.

In another embodiment, a method of controlling a continuously variable electric drivetrain, comprises: providing a first motor-generator, a second motor-generator, and a high ratio traction drive transmission having a ring member, a carrier configured to support a plurality of traction members, and a sun member, wherein one of the ring member, the carrier, and the sun member is operably coupled to the first motor-generator, wherein one of the ring member, the carrier, and the sun member transmits a rotational power, and wherein one of the ring member, the carrier, and the sun member is operably coupled to the second motor-generator; measuring a speed of at least one of the carrier, the ring member, the sun member, the first motor-generator, and the second motor-generator; determining a kinematic speed of at least one of the carrier, the ring member, the sun member, the first motor-generator, and the second motor-generator based on the speed of at least one of the first motor-generator and the second motor-generator; and determining a slip state of the high ratio traction drive transmission based on a comparison of the measured speed of at least one of the carrier, the ring member, the sun member, the first motor-generator, and the second motor-generator to the kinematic speed of at least one of the carrier, the ring member, the sun member, the first motor-generator, and the second motor-generator.

As aspects of certain embodiments, the method further comprises determining a ring slip based on a comparison of the speed of the ring member to the speed of the at least one of the first motor-generator and the second motor-generator.

As aspects of certain embodiments, the method further comprises determining a sun slip based on a comparison of the speed of the sun member to the speed of the at least one of the first motor-generator and the second motor-generator.

As aspects of certain embodiments, the method further comprises commanding a change in the speed of the at least one of the first motor-generator and the second motor-generator based on the ring slip.

As aspects of certain embodiments, the method further comprises commanding a change in the speed of the at least one of the first motor-generator and the second motor-generator based on the sun slip.

As aspects of certain embodiments, the method further comprises commanding a change in a power ratio between the first motor-generator and the second motor-generator based on the slip state.

As aspects of certain embodiments, wherein commanding the change in the power ratio includes adjusting the speed of at least one of the first motor-generator and the second motor-generator.

In yet another embodiment, a method of controlling a continuously variable electric drivetrain, comprises: providing a motor-generator and a high ratio traction drive transmission including a sun member, a carrier configured to support a plurality of traction members, a ring member in contact with the traction members, wherein at least one of the ring member, the carrier, and the sun member is operably coupled to the motor-generator, wherein at least one of the ring member, the carrier, and the sun member transmits a rotational power, and wherein at least one of the ring member, the carrier, and the sun member is caused to remain stationary; measuring an output speed of the continuously variable electric drivetrain; determining a kinematic output speed of the continuously variable electric drivetrain based on a ring-to-sun ratio of the high ratio traction drive transmission; and determining a slip state of the high ratio traction drive transmission based on a comparison of the output speed to the kinematic output speed.

As aspects of certain embodiments, the method further comprises mitigating the slip state of the high traction drive transmission by adjusting a speed of the motor-generator.

BRIEF DESCRIPTION OF THE FIGURES

The accompanying drawings are incorporated herein as part of the specification. The drawings described herein illustrate embodiments of the presently disclosed subject matter, and are illustrative of selected principles and teaching of the present disclosure and do not illustrate all possible implementations thereof. The drawings are not intended to limit the scope of the present disclosure in any way. A better understanding of the features and advantages of the present embodiments will be obtained by reference to the following detailed description that sets forth illustrative embodiments, in which the principles of the preferred embodiments are utilized, and the accompanying drawings of which.

DETAILED DESCRIPTION

It is to be understood that the presently disclosed subject matter may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Furthermore, preferred embodiments include several novel features, no single one of which is solely responsible for its desirable attributes or which is essential to practicing the embodiments described.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling is capable of taking a variety of forms, which in certain instances will be readily apparent to a person of ordinary skill in the relevant technology.

It should be noted that reference herein to "traction" does not exclude applications where the dominant or exclusive mode of power transfer is through "friction." Without attempting to establish a categorical difference between traction and friction drives here, generally these will be understood as different regimes of power transfer. Traction drives usually involve the transfer of power between two elements by shear forces in a thin fluid layer trapped between the elements. The fluids used in these applications usually exhibit traction coefficients greater than conventional mineral oils. The traction coefficient ($\mu$) represents the maximum available traction force which would be available at the interfaces of the contacting components and is the ratio of the maximum available drive torque per contact force. Typically, friction drives generally relate to transferring power between two elements by frictional forces between the elements. For the purposes of this disclosure, it should be understood that the transmissions described here are capable of operating in both tractive and frictional applications based on the torque and speed conditions present during operation.

Figure 1:
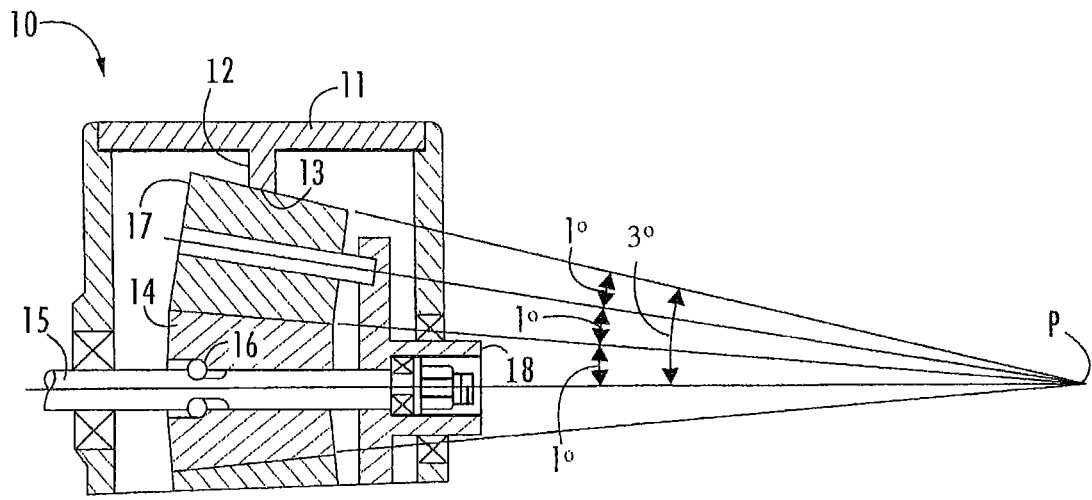
FIG. 1 is a cross-sectional view of a simplified high ratio traction drive transmission having a tapered roller.

Referring to FIG. 1, in some embodiments, high ratio traction drive transmissions are characterized by having an arrangement providing a spin free traction roller engagement. High ratio eccentric planetary traction drive transmissions found in U.S. Pat. No. 8,152,677, fixed ratio traction drive transmissions found in U.S. Pat. No. 4,709,589, planetary-roller transmission with elastic roller or ring found in U.S. Pat. No. 4,483,216, and high ratio planetary transmissions found in U.S. Pat. Nos. 4,846,008, and 5,385,514 are illustrative examples are traction planetary devices implemented herein.

In some embodiments, the traction drive transmission 10 includes a transmission housing 11 provided with a race ring 12 having a race surface 13. A slightly conical sun roller 14 may be supported on an input shaft 15 by way of a cam structure 16. Slightly conical planetary rollers 17 may be supported for orbiting with an output shaft 18. In certain embodiments, the planetary rollers 17 may be in engagement with the race ring 12 and the sun roller 14. The cam structure 16 may be configured to force the sun roller 14 between the planetary rollers 17 to provide traction surface engagement forces depending on the amount of torque transmitted. As shown, all axial tangents of all the traction surfaces intersect in a single point P on the transmission axis so that true rolling conditions are provided for all traction surfaces. This results in high-efficiency operation of the transmission and little wear of the traction surfaces.

Figure 2:
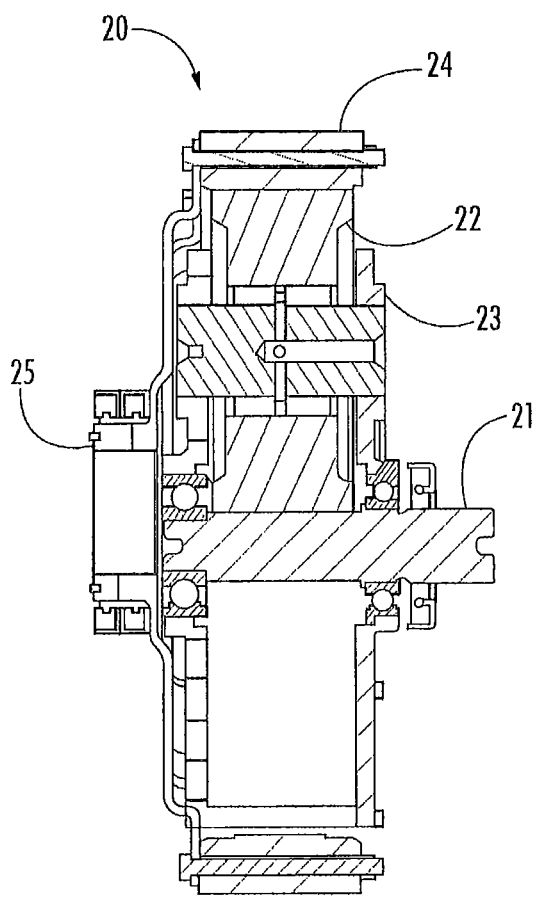
FIG. 2 is a cross-sectional view of an embodiment of a high ratio traction drive transmission of an offset traction roller transmission type.
Figure 3:
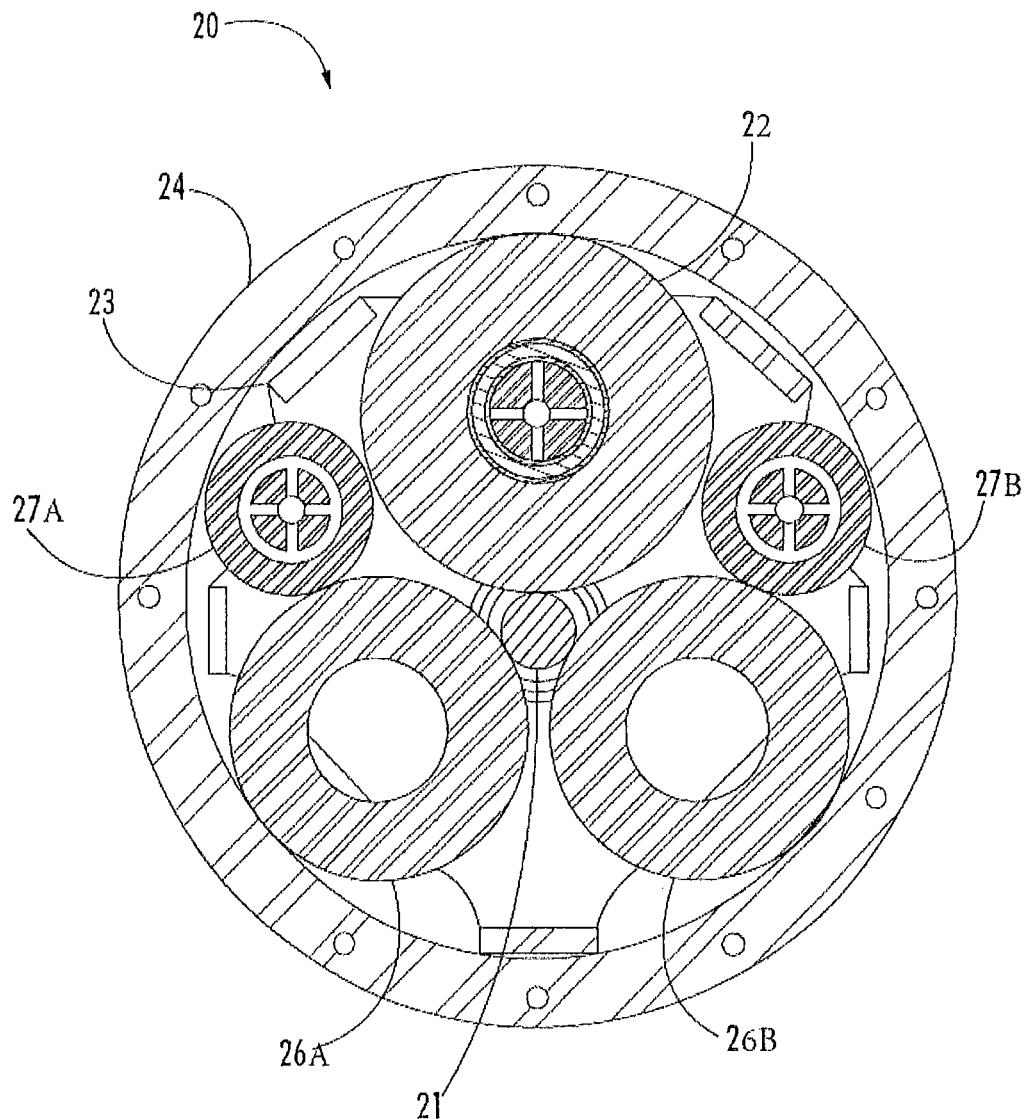
FIG. 3 is a cross-section plan view of the offset-type traction roller transmission of FIG. 2.

Referring to FIGS. 2 and 3, in some embodiments, a high ratio traction drive transmission 20 includes a sun roller 21 in traction engagement with a traction roller 22. In some embodiments, the traction roller 22 may be supported in a non-rotatable carrier 23. The traction roller 22 may be in traction engagement with a traction ring 24. The traction ring 24 may be located radially outward of the traction roller 22 and the sun roller 21. In certain embodiments, a ring coupling 25 may be coupled to the traction ring 24 and configured to transmit rotational power in or out of the high ratio traction drive transmission 20. In some embodiments, the axis of the sun roller 21 may be offset radially with respect to the rotational center of the traction ring 22 when viewed in the plane of the page of FIG. 2. In some embodiments, the transmission 20 may be provided with a set of floating traction rollers 26 (labeled as "26A" and "26B" in FIG. 3) coupled to the sun roller 21. The transmission 20 also may be provided with a set of reaction rollers 27 (labeled as "27A" and "27B" in FIG. 3) supported in the carrier 23 by support bearings. In some embodiments, the traction roller 22 may be supported in the carrier 23 by a support bearing. In other embodiments, the traction roller 22 may be supported by the sun roller 21 and the reaction rollers 27. During operation of the transmission 20, the reaction rollers 27 provide torque dependent pressure to the floating traction rollers 26 which may be transferred to the traction ring 24 and the traction roller 22 to thereby transmit torque through traction contact.

Figure 4:
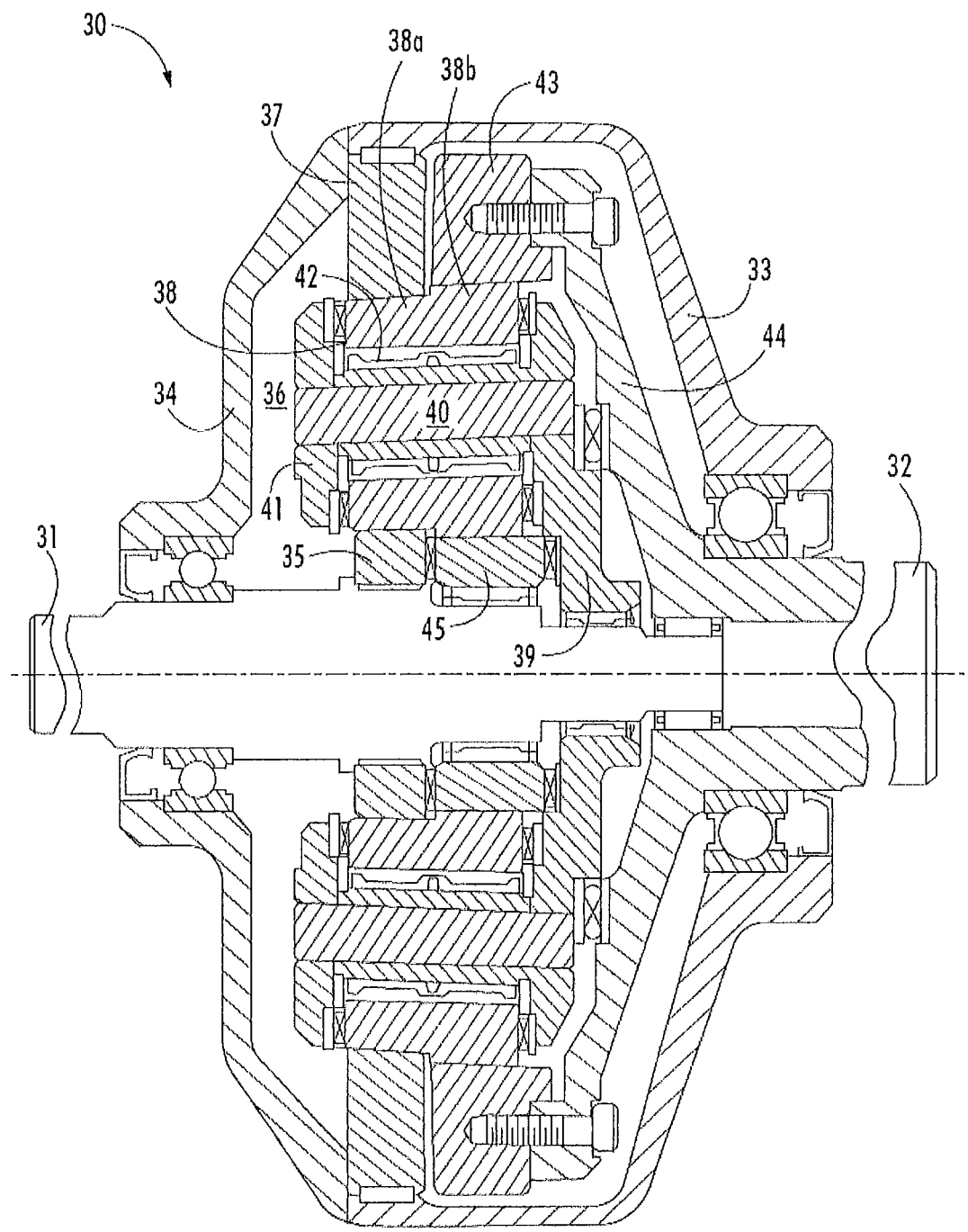
FIG. 4 is a cross-sectional view of an embodiments of a high ratio traction drive transmission of a tapered planetary traction roller transmission type.

Referring now to FIG. 4, in certain embodiments, a high ratio traction drive transmission 30 includes a coaxial input and output shafts 31 and 32 rotatably supported in a housing 33 and a housing cover 34.

In some embodiments, the input shaft 31 has a sun roller 35 mounted thereon which forms the center roller of a first planetary traction roller 36 including a stationary first traction ring 37 arranged radially outward of the sun roller 35. A set of planetary type traction rollers 38 may be disposed in the space between the first traction ring 37 and the sun roller 35 and in motion-transmitting engagement with both of them. The planetary traction rollers 38 may be rotatably supported on a first planetary roller carrier 39.

The traction drive transmission 30 includes for each planetary traction roller 38 a support shaft 40 which may be supported at its free end by a support ring 41 and on which the planetary traction roller 38 may be supported by a bearing 42.

In some embodiments, the planetary traction rollers 38 include two sections, a first section 38a and a second section 38b of different diameters. The first section 38a may be in engagement with the first traction ring 37 and the sun roller 35. The second section 38b may be in engagement with a second traction ring 43, which may be mounted for rotation with the output shaft 32 via a support disc 44.

In some embodiments, the second section 38b may be coupled to a support sun roller 45 which may be hollow so that the input shaft 31 may extend therethrough.

Various axial thrust bearings may be provided for the accommodation of the axial forces in the transmission. It may be noted, however, that the support shafts 40 of the planetary traction rollers 38 may be arranged at a slight angle with respect to the axis of the input and output shafts and that the traction surfaces of the planetary traction rollers 38 may be slightly conical. The traction surfaces of the stationary first traction ring 37 and of the rotatable second traction ring 44 may be correspondingly conical so that the planetary traction rollers 38 may be forced into the conical space defined by the traction rings upon assembly of the transmission.

Figure 5:
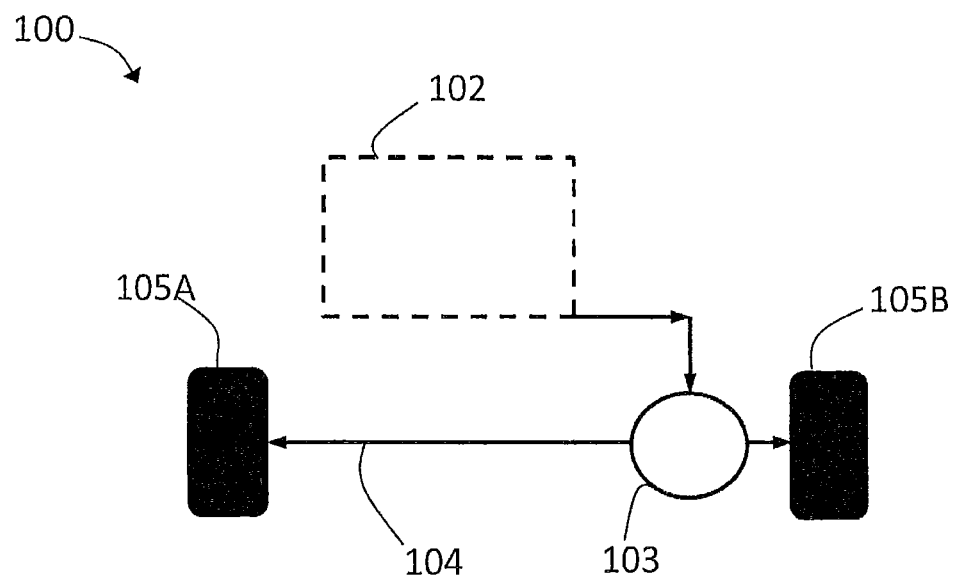
FIG. 5 is a schematic illustration of an electric axle having a continuously variable electric drivetrain.

Referring to FIG. 5, in some embodiments, an electric axle powertrain 100 includes a continuously variable electric drivetrain 102 operably coupled to a differential 103.

In some embodiments, the differential 103 may be a common differential gear set implemented to transmit rotational power. The differential 103 may be operably coupled to a wheel drive axle 104 configured to drive a set of vehicle wheels 105 (labeled as "105A" and "105B" in FIG. 5).

Figure 6:
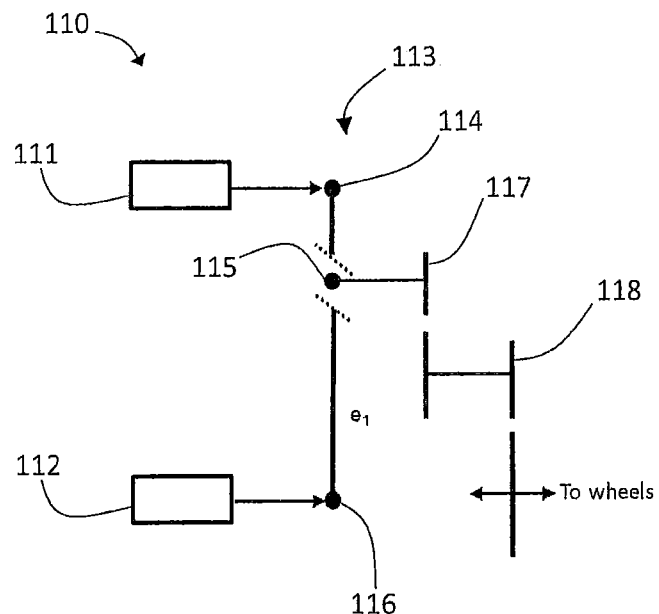
FIG. 6 is a lever diagram of yet another embodiment a continuously variable electric drivetrain having two motors and a high ratio traction drive transmission.

Referring now to FIG. 6, in some embodiments, a continuously variable electric drivetrain (CVED) 110 may be optionally configured to be used in the electric axle powertrain 100. In some embodiments, the CVED 110 may be provided with a first combined motor-generator 111 and a combined second motor-generator 112 operably coupled to a high ratio traction drive transmission 113. The motor-generators 111, 112 are types of electric machines. It should be appreciated that the motor-generators 111, 112 may be separate and distinct motor and generator.

In some embodiments, the high ratio traction drive transmission 113 includes a ring member 114 in contact with a number of traction rollers supported in a carrier 115, each traction roller in contact with a sun member 116.

In some embodiments, the carrier 115 may be configured to transfer rotational power out of the CVED 110.

In some embodiments, the first motor-generator 111 may be operably coupled to the ring member 114.

In some embodiments, the second motor-generator 112 may be operably coupled to the sun member 116. It should be appreciated that the high ratio traction drive transmission 113 may be depicted as a lever diagram to simplify the kinematic relationship between components in the CVED 110, and that the high ratio traction drive transmission 113 may be configured in a variety of physical forms as described previously.

In some embodiments, the CVED 110 may be provided with multiple downstream gears that provide torque multiplication to the driven wheels.

In some embodiments, the CVED 110 may be provided with a first transfer gear 117 coupled to the carrier 115.

In some embodiments, the first transfer gear 117 couples to a second transfer gear 118. The first transfer gear 117 and the second transfer gear 118 can be coaxial planetary gear sets or can be transfer gear arrangements as depicted in FIG. 6.

Figure 7:
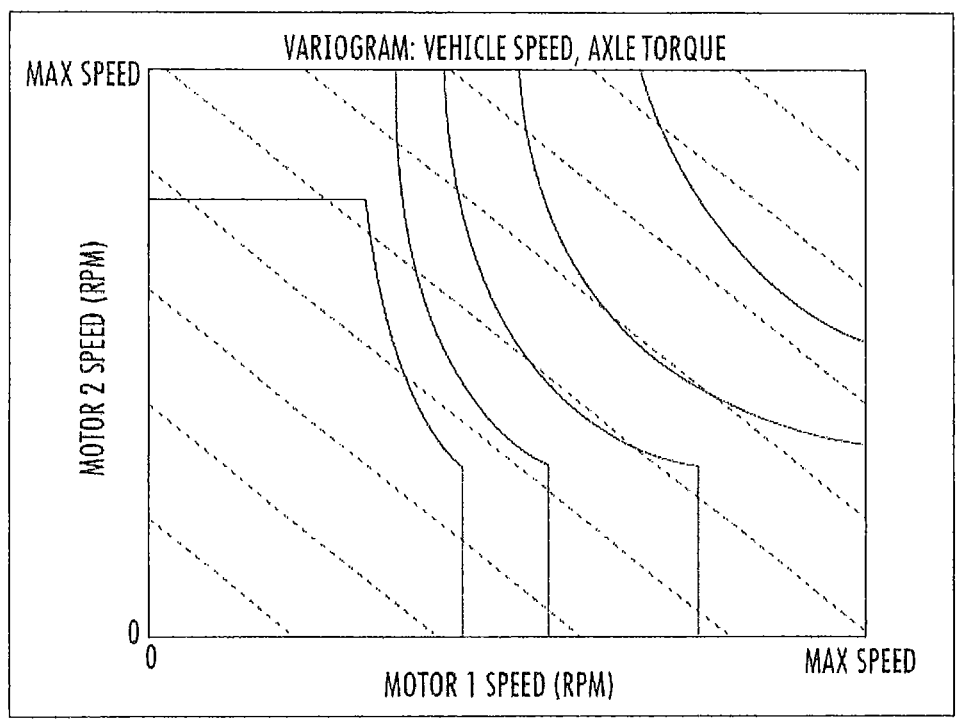
FIG. 7 is a variogram showing the range of possible vehicle speeds and axle torques as a function of motor speeds for a representative configuration of the above embodiments.

Turning now to FIG. 7, an illustrative example of a variogram is shown depicting the range of possible vehicle speeds and axle torques as a function of the first motor-generator speed (x-axis) and the second motor-generator speed (y-axis). During operation of the CVED 110, the first motor-generator 111 may be connected to the ring member 114 and may be a low-speed, high-torque device used in torque-control mode. The second motor-generator 112 may be a high-speed, low-torque device connected to the sun member 116 and used in speed-control mode. Output of the CVED 110 may be taken from the carrier 115. The high ratio traction drive transmission 113 functions as a summing planetary and each motor-generator 111, 112 may be controlled to perform in a peak efficiency region as vehicle speed and power requirements change throughout operation.

It should be appreciated that the choice of the ring to sun ratio "$e_1$" for the summing planetary 113 may be selected to account for the asymmetric nature of the motor-generators 111, 112 (either in the speed, torque, or power domain).

Figure 8:
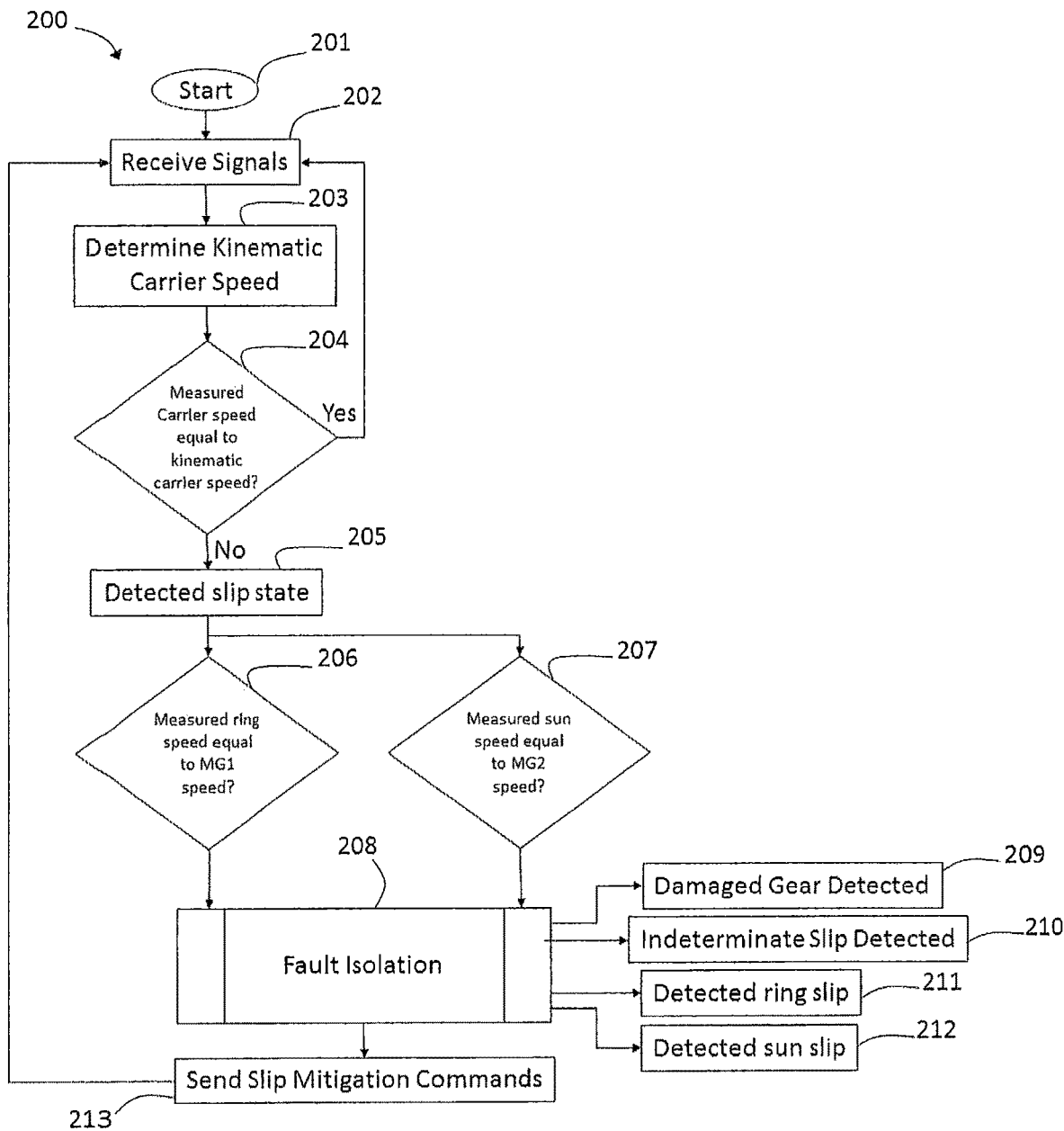
FIG. 8 is a flow chart depicting a control process that is used for continuously variable electric drivetrains having two motors and a high ratio traction drive transmission.

Turning now to FIG. 8, in some embodiments, a control process 200 may be electronically implemented in a controller used for the CVED 110. For description purposes, the control process 200 will reference the CVED 110 as an illustrative example.

Those of skill will recognize that the various illustrative logical blocks, modules, circuits, and algorithm steps described in connection with the embodiments disclosed herein, including with reference to the transmission control system described herein, for example, may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality may be implemented as hardware or software depends upon the particular application and design constraints imposed on the overall system. Skilled artisans may implement the described functionality in varying ways for each particular application, but such implementation decisions should not be interpreted as causing a departure from the scope of the presently disclosed subject matter.

For example, various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Software associated with such modules may reside in RAM memory, flash memory, ROM memory, EPROM memory, EEPROM memory, registers, a hard disk, a removable disk, a CD-ROM, or any other suitable form of storage medium known in the art. An exemplary storage medium may be coupled to the processor such that the processor reads information from, and writes information to, the storage medium. In the alternative, the storage medium may be integral to the processor. The processor and the storage medium may reside in an ASIC. For example, in some embodiments, a controller for use of control of the CVED 110 a processor (not shown).

In some embodiments, a controller (not depicted) of the CVED 110 optionally includes an input signal processing module, a transmission control module and an output signal processing module. The input signal processing module may be configured to receive a number of electronic signals from sensors provided on the vehicle and/or drivetrain. The sensors may include temperature sensors, speed sensors, position sensors, among others. In some embodiments, the signal processing module may include various sub-modules to perform routines such as signal acquisition, signal arbitration, or other known methods for signal processing. The output signal processing module may be configured to electronically communicate to a variety of actuators and sensors.

The control process 200 begins at a start state step 201 and proceeds to a step 202 where a number of signals may be received. In some embodiments, the signals include a carrier speed $\omega_{carrier}$ corresponding to the carrier 115, for example, a ring speed $\omega_{ring}$ corresponding to the ring member 114, for example, and a sun speed $\omega_{sun}$ corresponding to the sun member 116, among other signals for processing. In some embodiments, the signals include a wheel speed signal, a wheel slip status signal from an anti-lock braking module, a wheel slip status signal from a traction control module, a signal indicative of a driver demand load, among other signals for processing, and the like, for example.

The control process proceeds to a step 203 where a kinematic carrier speed $\omega_{carrier\_k}$ may be determined. In the embodiment shown, the kinematic carrier speed to $\omega_{carrier\_k}$ has a fixed kinematic relationship to vehicle speed when it may be assumed that there may be no wheel slip to the ground. It is understood, however, that depending on which component of the high ratio traction drive transmission 113 is driveably coupled to the first motor-generator 111, which component is driveably coupled to the second motor-generator 112, and which component is the output, the fixed kinematic relationship to the vehicle speed when it may be assumed that there may be no wheel slip to the ground may be with the output (i.e. the ring member 114 or the sun member 116) instead of the carrier 115 as described hereinafter.

Given that a speed $\omega_{MG2}$ of the second motor-generator 112 and a speed $\omega_{MG1}$ of the first motor-generator 111 may be independent of one another, and that the measured and target values are known, slip diagnostic for the CVED 110 may be available. For example, the motor-generator 111 may be in a speed-control mode with a commanded target speed for comparison to the measured speed from a sensor while the motor-generator 112 may be in torque-control mode. However, once the output speed of the CVED 110 may be known, and it has been determined that wheel slip may be not active, and given that the motor-generator 111 has a known target speed, the target speed of the motor-generator 112 may be calculated form the kinematic relationship through the planetary for comparison to the measured speed from the sensor. It is understood, that the motor-generators 111, 112 may substituted for each other, and more particularly, the motor-generator 112 may be in a speed-control mode with a commanded target speed for comparison to the measured speed from a sensor while the motor-generator 111 may be in torque-control mode. It is further understood that any type of speed sensors may be employed in the control process 200. In some embodiments, the target values may be based on a system or an operator demand. Further, fault isolation to determine the slipping traction interface may be also possible.

The step 203 implements a planetary speed constraint to determine the kinematic carrier speed $\omega_{carrier\_k}$ expressed as the following, where $e_1$ may be the ring-to-sun ratio of the high ratio traction drive transmission 113:

$$\omega_{carrier\_k}*(e_1+1)=\omega_{MG2}+\omega_{MG1}*e_1$$

As a non-limiting example, the kinematic carrier speed $\omega_{carrier\_k}$ is calculated based upon the measured speed $\omega_{MG1}$, $\omega_{MG2}$ of at least one of the respective motor-generators 111, 112.

In some embodiments, the control process 200 proceeds to a first evaluation step 204 where the measured carrier speed $\omega_{carrier}$ of at least one of the respective motor-generators 111, 112 received in the step 202 may be compared with the kinematic carrier speed $\omega_{carrier\_k}$ determined in the step 203. If the first evaluation step 204 returns a true result, indicating that the measured carrier speed $\omega_{carrier}$ of at least one of the respective motor-generators 111, 112 may be substantially equal to the kinematic carrier speed $\omega_{carrier\_k}$, the control process 200 returns to the step 202. It should be appreciated that a CVED 110 transmits torque only when there may be a shear force developed at a fluid interface. The shear force may only be present when a slip speed occurs across a contact patch. Thus, the CVED 110 may be constantly experiencing a measurable amount of slip required for operation of the CVED 110, and the measured carrier speed $\omega_{carrier}$ of at least one of the respective motor-generators 111, 112 may not be exactly equal to the kinematic carrier speed $\omega_{carrier\_k}$. Therefore, a threshold tolerance may be applied to the speed comparison in step 204 such that a false result indicating slip detected occurs only when the measured carrier speed $\omega_{carrier}$ received in the step 202 compared with the kinematic carrier speed $\omega_{carrier\_k}$ determined in the step 203 exceeds the threshold tolerance. In some embodiments, the threshold tolerance may be calibratable. In certain embodiments, the threshold tolerance is calculated or determined as a function of traction drive torque load and traction drive input speed, and thus implemented in a lookup table.

If the first evaluation step 204 returns a false result, indicating that the measured carrier speed $\omega_{carrier}$ may be not substantially equal to the kinematic carrier speed $\omega_{carrier\_k}$ and in excess of the tolerance threshold, the control process 200 proceeds to a step 205 where signals corresponding to a detected slip state may be transmitted to other modules of the control system such as a motor control module, a traction control module, an anti-lock braking control module, and the like, for example.

In some embodiments, the control process 200 proceeds to a second evaluation step 206 and a third evaluation step 207 in parallel, i.e. substantially simultaneously. The second evaluation step 206 compares a measured ring speed $\omega_{ring}$ to the speed $\omega_{MG1}$ of the first motor-generator 111. The third evaluation step 207 compares the measured sun speed $\omega_{sun}$ to the speed $\omega_{MG2}$ of the second motor-generator 112. The results from the second evaluation step 206 and the third evaluation step 207 may be passed to a function step 208 where fault isolation diagnostics may be performed. In some embodiments, the function step 208 compares the result of the second evaluation step 206 and the third evaluation step 207.

If the second evaluation step 206 passes a true result to the function step 208, indicating that the speed $\omega_{ring}$ of the ring member 114 may be substantially equal to the speed $\omega_{MG1}$ of the first motor-generator 111, and the third evaluation step 207 passes a true result to the function step 208, indicating that the speed $\omega_{sun}$ of the sun member 116 may be substantially equal to the speed $\omega_{MG2}$ of the second motor-generator 112, the function step 208 returns a true result as a detected damaged gear signal 209. The detected damaged gear signal 209 indicates that the source of the detected slip state 205 may be malfunction or damage to the first transfer gear 117, for example.

If the second evaluation step 206 passes a false result to the function step 208, indicating that the speed $\omega_{ring}$ of the ring member 114 may not be substantially equal to the speed $\omega_{MG1}$ of the first motor-generator 111, and the third evaluation step 207 passes a false result to the function step 208, indicating that the speed $\omega_{sun}$ of the sun member 116 may not be substantially equal to the speed $\omega_{MG2}$ of the second motor-generator 112, the function step 208 returns a true result as an indeterminant slip signal 210. The indeterminant slip signal 210 indicates that the source of the detected slip state 205 may be within the high ratio traction drive transmission 113; however, the fault isolation routine may be unable to determine which traction component and/or interface may be slipping.

If the second evaluation step 206 passes a false result to the function step 208, indicating that the speed $\omega_{ring}$ of the ring member 114 may not be substantially equal to the speed $\omega_{MG1}$ of the first motor-generator 111, and the third evaluation step 207 passes a true result to the function step 208, indicating that the speed $\omega_{sun}$ of the sun member 116 may be substantially equal to the speed $\omega_{MG2}$ of the second motor-generator 112, the function step 208 returns a true result as a detected ring slip signal 211. The detected ring slip signal 211 indicates that the source of the detected slip state 205 may be between the ring member 114 and the traction rollers 22 supported in the carrier 115.

If the second evaluation step 206 passes a true result to the function step 208, indicating that the speed $\omega_{ring}$ of the ring member 114 may be substantially equal to the speed $\omega_{MG1}$ of the first motor-generator 111, and the third evaluation step 207 passes a false result to the function step 208, indicating that the speed $\omega_{sun}$ of the sun member 116 may not be substantially equal to the speed $\omega_{MG2}$ of the second motor-generator 112, the function step 208 returns a true result as a detected sun slip signal 212. The detected sun slip signal 212 indicates that the source of the detected slip state 205 may be between the sun member 116 and the traction rollers 22 supported in the carrier 115.

In some embodiments, the control process 200 passes signals from the function step 208 to a step 213 where commands may be sent to the CVED 110 to mitigate the detected slip state 205. For example, commands transmitted to the CVED 110 may be described in reference to FIG. 10.

It should be appreciated that the evaluation steps implemented in the control process 200 can be configured to compare measured speeds $\omega_{carrier}$, $\omega_{rings}$, $\omega_{sun}$ to calibratable tolerance thresholds that account for a known allowable slip between components.

Figures 9, 10:
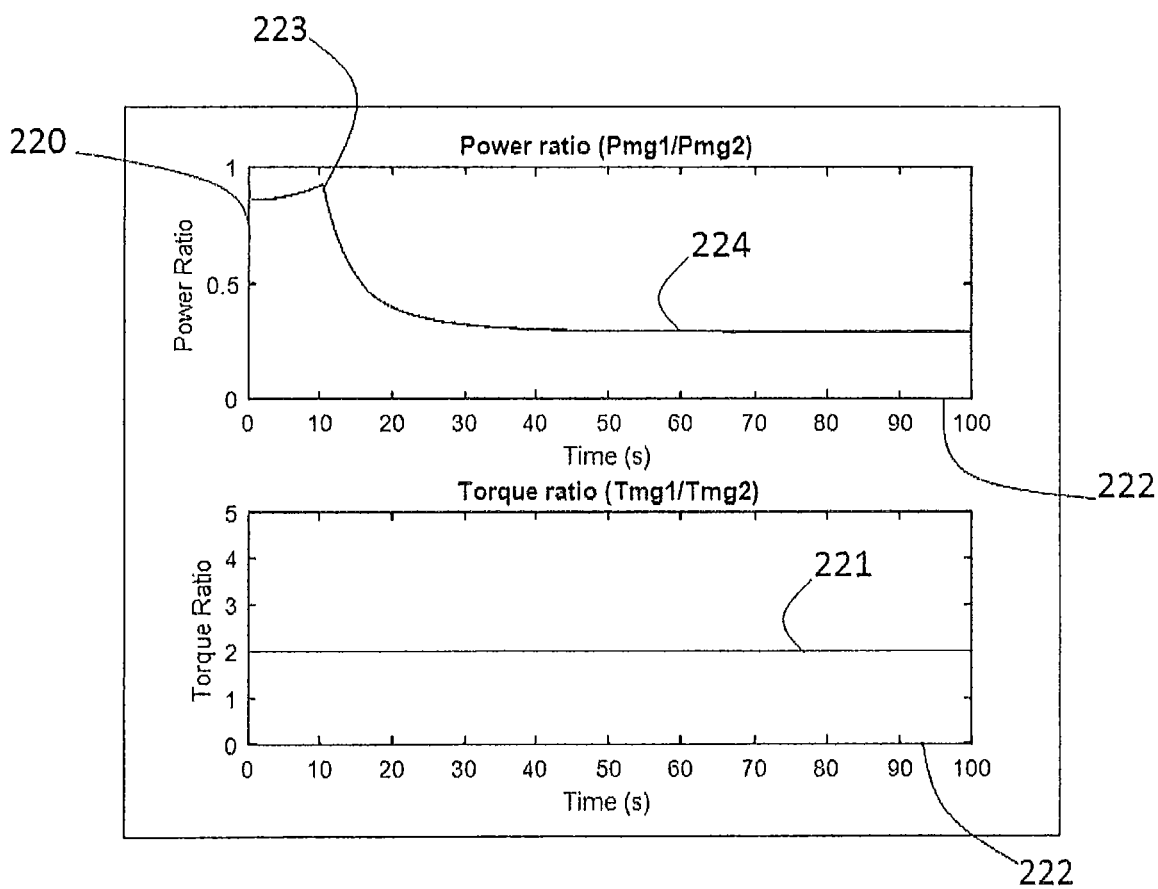
FIG. 9 is a table depicting a number of diagnostic states for continuously variable electric drivetrains having two motors and a high ratio traction drive transmission.
FIG. 10 is a chart depicting power ratio and torque ratio versus time during slip mitigation for a continuously variable electric drivetrain having two motors and a high ratio traction drive transmission.

Referring now to FIG. 9, a table 215 summarizes the diagnostic slip states corresponding to the control process 200. If the carrier speed $\omega_{carrier}$ from a sensor or calculated via wheel speeds and the ring-to-sun ratio disagrees with the kinematic carrier speed $\omega_{carrier\_k}$ calculated from the kinematic relationship to the speeds $\omega_{MG1}$, $\omega_{MG2}$ of at least one of the motor-generators 111, 112, then the traction drive may be in a slip state.

$$\omega_{carrier\_k} \neq \omega_{MG2}+\omega_{MG1}*e_1/e_1+1$$

Fault isolation to the slipping contact/interface then requires an additional sensor to compare another component speed (i.e. the speed $\omega_{ring}$ of the ring member 114 or the speed $\omega_{sun}$ of the sun member 116) to the respective speed $\omega_{MG1}$, $\omega_{MG2}$ of at least one of the motor-generators 111, 112 that may be driving that node.

$$\omega_{ring} \neq \omega_{MG1} \text{ OR } \omega_{sun} \neq \omega_{MG2}$$

Finally, with sensors on all components, an indeterminate slip state can be detected where both contacts may be slipping.

$$\omega_{sun} \neq \omega_{MG2} \text{ AND } \omega_{ring} \neq \omega_{MG1}$$

Referring now to FIG. 10, in some embodiments, generating commands for slip mitigation may be accomplished by altering a power ratio between the first motor-generator 111 and the second motor-generator 112. The torque ratio may be constant and substantially equal to $e_1$; however, altering a speed set-point of one of the motor-generators 111, 112 changes the power ratio between contacting components of the high ratio traction transmission 113. Because slip may be a strong function of power through each contact, an alteration of the power ratio can be used to mitigate slip. If both the motor-generators 111, 112 may be below their respective base speed and consequently below peak power output, slip mitigation by altering the power ratio between the motor-generators 111, 112 while still meeting the current output power demand may be possible. If it is determined that the slipping component is coupled to the one of the motor-generators 111, 112 that is in the torque-control mode, that one of the motor-generators 111, 112 can then be switched from the torque-control mode to the speed-control mode in order to adjust the speed thereof and mitigate the slip state. This is accomplished by altering the speed command target of the one of the motor-generators 111, 112 that is coupled to the slipping component and in the speed-control mode such that the respective speed $\omega_{MG1}$, $\omega_{MG2}$ of the one of the motor-generators 111, 112 and hence power through the slipping contact may be reduced. Consequently, the power carried by the non-slipping contact may be increased. Once both the motor-generators 111, 112 may be above their respective base speeds or speed of operation for rated torque, the power ratio may be constant and slip mitigation requires a reduction in the output power of the drive. A damaged gear state determined in step 208 requires that the output power of the CVED 110 be reduced to zero by disabling the motors.

FIG. 10 depicts a power ratio 220 and a torque ratio 221 versus time 222 for a commanded slip mitigation. The commands for slip mitigation may be dependent on operating points of both the motor-generators 111, 112. If both the motor-generators 111, 112 may be below base speed, power ratio between the motor-generators 111, 112 can be altered to mitigate slip and still meet drive cycle power demand. For example, the power ratio may be adjusted from a point 223 to a constant value 224. Operation at the power ratio corresponding to the constant value 224 does not result in slip. If the motor-generators 111, 112 may be above base speed, the power demand at the slipping contact must be reduced and the operator's power demand may be not met. Similarly, if an indeterminate slip state may be determined, the total power demand must be reduced.

It should be appreciated that the control process 200 may continuous and therefore, the steps 202 through 213 of the control process 200 may be repeated as many times as is necessary.

Figure 11:
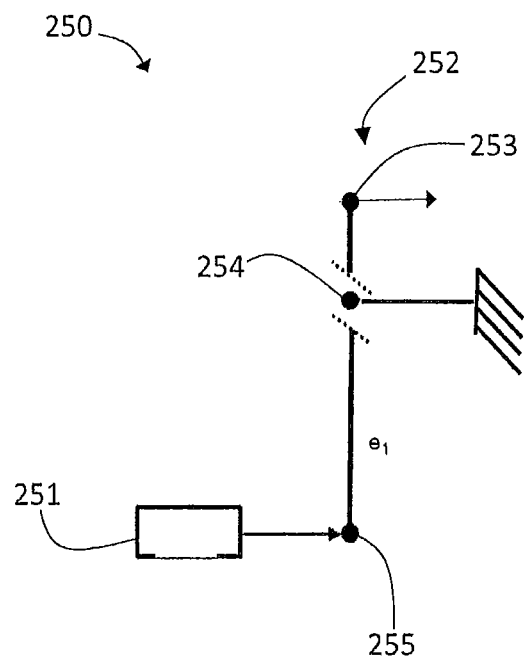
FIG. 11 is a lever diagram of a continuously variable electric drivetrain having a motor and a high ratio traction drive transmission.

Referring now to FIG. 11, in some embodiments, a continuously variable electric drivetrain (CVED) 250 includes a motor-generator 251 and a high ratio traction drive transmission 252.

In some embodiments, the high ratio traction drive transmission 252 may be one of the examples provided in FIGS. 1-4.

In some embodiments, the high ratio traction drive transmission 252 includes a ring member 253 in contact with a number of traction rollers supported in a carrier 254, each traction roller in contact with a sun member 255.

In some embodiments, the motor-generator 251 may be operably coupled to the sun member 255.

In some embodiments, the carrier 254 may be a grounded member and non-rotatable.

In some embodiments, the ring member 253 may be configured to transfer a rotational power out of the CVED 250.

Figure 12:
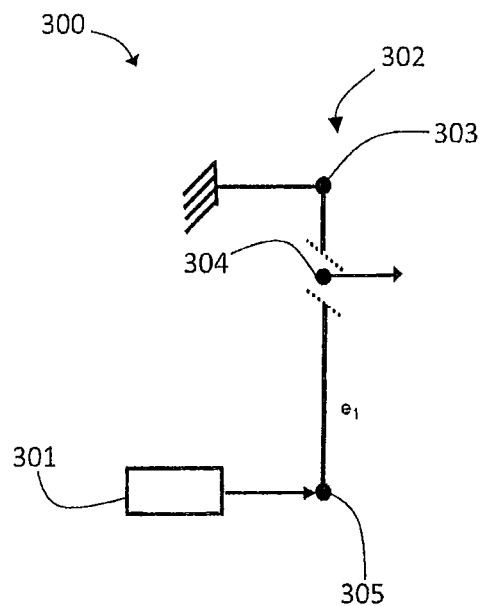
FIG. 12 is a lever diagram of another continuously variable electric drivetrain having a motor and a high ratio traction drive transmission.

Referring now to FIG. 12, in some embodiments, a continuously variable electric drivetrain (CVED) 300 includes a motor-generator 301 and a high ratio traction drive transmission 302.

In some embodiments, the high ratio traction drive transmission 302 may be one of the examples provided in FIGS. 1-4.

In some embodiments, the high ratio traction drive transmission 302 includes a ring member 303 in contact with a number of traction rollers supported in a carrier 304, each traction roller in contact with a sun member 305.

In some embodiments, the motor-generator 301 may be operably coupled to the sun member 305.

In some embodiments, the ring member 303 may be a grounded member and non-rotatable.

In some embodiments, the carrier 304 may be configured to transfer a rotational power out of the CVED 300.

Figure 13:
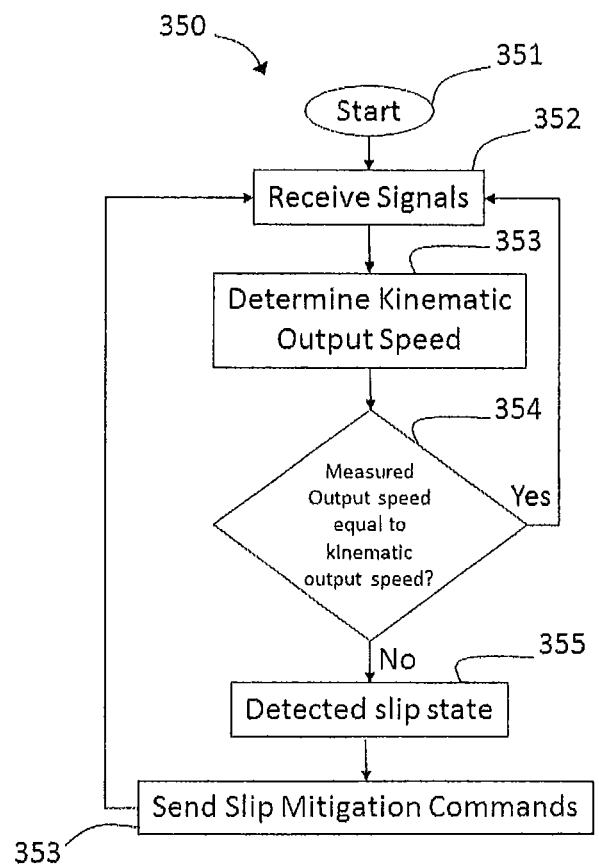
FIG. 13 is a flow chart depicting a control process that is used for continuously variable electric drivetrains having a motor and a high ratio traction drive transmission.

Referring now to FIG. 13, in some embodiments, a control process 350 may be implemented during operation of continuously variable electric drivetrains having a single motor-generator such as the CVED 250 or the CVED 300. For simplicity of description purposes, the control process 350 will be described in reference to the CVED 250 only. It is understood, however, that the implementation of the control process 350 during operation of the CVED 300 is substantially similar to the implementation of the control process 350 during operation of the CVED 250 described hereinafter.

In some embodiments, the control process 350 begins at a start state 351 and proceeds to a step 352 where a number of signals may be received such as an output speed $\omega_{output}$ the CVED 250. The control process 350 proceeds to a step 353 where a kinematic output speed $\omega_{output\_k}$ may be determined based on the ring-to-sun ratio of the high ratio traction drive transmission 252.

The control process 350 proceeds to an evaluation step 354 where the measured output speed $\omega_{output}$ may be compared to the kinematic output speed $\omega_{output\_k}$ determined in the step 353. If the evaluation step 354 returns a true result, indicating that the measured output speed $\omega_{output}$ may be substantially equal to the kinematic output speed $\omega_{output\_k}$, the control process 350 returns to the step 352. If the evaluation step 354 returns a false result, indicating that the measure output speed $\omega_{output}$ may not be substantially equal to the kinematic output speed $\omega_{output\_k}$, the control process 200 proceeds to a step 355 where a detected slip state signal 355 may be formed and passed to other modules in the control system for the CVED 250. For example, other modules may include a motor control module, a traction control module, or an anti-lock braking control module, among others. It should be appreciated that the CVED 250 transmits torque only when there may be a shear force developed at a fluid interface. The shear force may only be present when a slip speed occurs across a contact patch. Thus, the CVED 250 may be constantly experiencing a measurable amount of slip required for operation of the CVED 250, and the measured output speed $\omega_{output}$ of the motor-generator 251 may not be exactly equal to the kinematic output speed $\omega_{output\_k}$. Therefore, a threshold tolerance may be applied to the speed comparison in step 354 such that a false result indicating slip detected occurs only when the measured output speed $\omega_{output}$ received in the step 352 compared with the kinematic output speed $\omega_{output\_k}$ determined in the step 353 exceeds the threshold tolerance. In some embodiments, the threshold tolerance may be calibratable. In certain embodiments, the threshold tolerance is calculated or determined as a function of traction drive torque load and traction drive input speed, and thus implemented in a look up table.

The control process 350 proceeds to a step 356 where commands may be transmitted to mitigate the slip state. In some embodiments, the commands for mitigating the slip may be torque commands to the motor-generator 251. Slip mitigation in the single motor embodiments of FIGS. 11 and 12 requires that the output power of the CVEDs 250, 300 be reduced during slip.

In some embodiments, the commands for mitigating the slip may be power commands to the motor-generators 251, 301 that can be adjusted based on a torque-control mode or a speed-control mode of the motor-generators 251, 301. For example, during a slip state of the CVED 250, 300, the motor-generators 251, 301 can be switched from a torque-control mode to a speed-control mode in order to adjust the speed of the motor-generators 251, 301 and mitigate the slip state. The speed command target may be set such that the motor-generators 251, 301 may be commanded to the correct kinematic speed for a non-slipping state. The motor-generators 251, 301 can be switched back to torque-control mode once the CVED 250, 300 may be no longer in a slip state.

It should be appreciated that the control process 350 may be continuous and therefore, the steps 352 through 353 of the control process 350 may be repeated as many times as is necessary.

It should also be noted that the description above has provided dimensions for certain components or subassemblies. The mentioned dimensions, or ranges of dimensions, may be provided in order to comply as best as possible with certain legal requirements, such as best mode. However, the scope of the embodiments described herein may be to be determined solely by the language of the claims, and consequently, none of the mentioned dimensions may be to be considered limiting on the inventive embodiments, except in so far as any one claim makes a specified dimension, or range of thereof, a feature of the claim.

While preferred embodiments have been shown and described herein, it will be obvious to those skilled in the art that such embodiments may be provided by way of example only. Numerous variations, changes, and substitutions will now occur to those skilled in the art without departing from the preferred embodiments. It should be understood that various alternatives to the embodiments described herein may be employed in practicing the presently disclosed subject matter. It is intended that the following claims define the scope of the preferred embodiments and that methods and structures within the scope of these claims and their equivalents be covered thereby.

What is claimed is:

1. A continuously variable electric drivetrain, comprising:
   a traction drive transmission;
   a first motor-generator and a second motor-generator coupled to the traction drive transmission; and
   an electronic controller configured to:
      receive a measured speed of a first rotating member of the continuously variable electric drivetrain;
      determine a calculated speed of the first rotating member or one of the motor-generators;
      determine a slip state of the traction drive transmission based on a comparison of the calculated speed and the measured speed; and
      if the traction drive transmission is determined to be in a state of slip, then mitigate the state of slip by adjusting a power ratio between the first motor-generator and the second motor-generator by switching the first motor-generator from a torque-control mode to a speed-control mode.

2. The continuously variable electric drivetrain of claim 1, wherein the traction drive transmission comprises a ring member, a carrier having a plurality of traction members, and a sun member.

3. The continuously variable electric drivetrain of claim 1, wherein the traction drive transmission comprises a traction ring, a sun roller, and a set of reaction rollers configured to provide torque dependent pressure to a set of floating traction rollers.

4. The continuously variable electric drivetrain of claim 2, wherein the ring member is a traction ring, the sun member is a sun roller mounted on an input shaft which forms a center roller of a first planetary traction roller including the traction ring arranged radially outward of the sun roller, and the plurality of traction members includes a set of planetary traction rollers disposed in a space between the traction ring and the sun roller.

5. A method of controlling a drivetrain, comprising:
   receiving a measured speed of a first rotating member of a continuously variable electric drivetrain;
   determining a calculated speed of the first rotating member or a motor;
   determining a slip state of a traction drive transmission based on a comparison of the calculated speed and the measured speed;
   determining a type of the slip state based on:
      a second comparison of a measured speed of a second rotating member to a second measured speed, and
      a third comparison of a measured speed of a third rotating member to a third measured speed; and
   if the traction drive transmission is determined to be in a state of slip, then mitigating the state of slip based on a speed of the motor connected to the traction drive transmission by switching the motor from a torque-control mode to a speed-control mode.

6. The method of claim 5, wherein the traction drive transmission is a high ratio traction drive comprising a ring member, a carrier configured to support a plurality of traction members, and a sun member.

7. The method of claim 5, wherein the motor is a first motor,
   wherein the traction drive transmission comprises a ring member, a carrier, and a sun member, and one of the ring member, the carrier, and the sun member is coupled to the first motor, and
   wherein one of the ring member, the carrier, and the sun member is coupled to a second motor.

8. The method of claim 5, wherein determining the calculated speed of the first rotating member is based on a speed of the motor.

9. The method of claim 5, wherein:
   the second comparison comprises comparing a measured speed of a ring member of the traction drive transmission to a measured speed of the motor;

the third comparison comprises comparing a measured speed of a sun member of the traction drive transmission and a measured speed of a second motor; and the mitigating the slip is based on the determined type of the slip state.

10. The method of claim 9, wherein determining the type of the slip state comprises determining that the slip state is due to a degraded gear responsive to the measured speed of the ring member being substantially equal to the measured speed of the motor and the measured speed of the sun member being substantially equal to the measured speed of the second motor.

11. The method of claim 10, wherein taking an action based on the determined type of the slip state comprises disabling the first motor-generator and the second motor-generator responsive to determining that the slip state is due to a degraded transfer gear.

12. The method of claim 5, wherein determining the type of the slip state comprises determining that the slip state is a ring slip responsive to a speed of a ring member of the traction drive transmission not being substantially equal to the speed of the motor and a speed of a sun member of the traction drive transmission being substantially equal to a speed of a second motor.

13. The method of claim 5, wherein the motor is a first motor and determining the type of the slip state comprises determining that the slip state is an indeterminate slip responsive to a speed of a ring member of the traction drive transmission not being equal to a speed of the first motor and a speed of a sun member not being equal to a speed of a second motor.

14. A method of controlling a continuously variable electric drivetrain, comprising:
 measuring an output speed of the continuously variable electric drivetrain;
 determining a second output speed of the continuously variable electric drivetrain;
 determining a slip state of a traction drive transmission based on an output comparison of the output speed to the second output speed; and
 in response to determining a positive slip state:
  performing a first comparison of a speed of a ring member of the traction drive transmission and a first motor speed;
  performing a second comparison of a speed of a sun member of the traction drive transmission and a second motor speed; and
  determining a fault based on the first comparison and the second comparison.

15. The method of claim 14, wherein the fault is determined as a ring slip if:
 a result of the first comparison is speeds that are not equal and a result of the second comparison is substantially equal speeds; and
 the fault is determined as a sun member slip if:
  the result of the first comparison is speeds that are substantially equal and the result of the second comparison is substantially equal speeds.

16. The method of claim 15, further comprising:
 in response to determining the fault is ring slip:
  adjusting a power ratio between a first motor and a second motor by switching the first motor from a torque-control mode to a speed-control mode; and
 in response to determining the fault is sun member slip:
  adjusting the power ratio between the first motor and the second motor by switching the second motor from the torque-control mode to the speed-control mode.

17. The method of claim 14, wherein the first motor is coupled to the sun member, a carrier is stationary, and the ring member is configured to output rotational power.

18. The method of claim 14, wherein the fault is determined as a damaged gear if results of the first comparison and the second comparison are substantially equal speeds.

19. The method of claim 9, wherein the second comparison comprises comparing a measured speed of a ring member of the traction drive transmission to a measured speed of the motor, and
 wherein the third comparison comprises comparing a measured speed of a sun member of the traction drive transmission and a measured speed of a second motor.

* * * * *